(12) United States Patent
Meaburn

(10) Patent No.: US 11,743,260 B2
(45) Date of Patent: Aug. 29, 2023

(54) DOMAIN NAME SECURITY IN CLOUD COMPUTING ENVIRONMENT

(71) Applicant: Barclays Execution Services Limited, London (GB)

(72) Inventor: Garry Meaburn, London (GB)

(73) Assignee: Barclays Execution Services Limited, London (GB)

( * ) Notice: Subject to any disclaimer, the term of this patent is extended or adjusted under 35 U.S.C. 154(b) by 210 days.

(21) Appl. No.: 17/127,262

(22) Filed: Dec. 18, 2020

(65) Prior Publication Data

US 2021/0194879 A1 Jun. 24, 2021

(30) Foreign Application Priority Data

Dec. 20, 2019 (EP) .................................. 19219006

(51) Int. Cl.
*H04L 29/06* (2006.01)
*H04L 9/40* (2022.01)
*H04L 61/4511* (2022.01)

(52) U.S. Cl.
CPC .......... *H04L 63/10* (2013.01); *H04L 61/4511* (2022.05); *H04L 63/0236* (2013.01); *H04L 63/20* (2013.01)

(58) Field of Classification Search
CPC ..... H04L 63/10; H04L 63/0236; H04L 63/20; H04L 63/164; H04L 63/1416; H04L 63/145

USPC ............................................................ 726/1
See application file for complete search history.

(56) References Cited

U.S. PATENT DOCUMENTS

| | | | |
|---|---|---|---|
| 9,560,072 B1* | 1/2017 | Xu | H04L 63/1475 |
| 10,187,356 B2* | 1/2019 | Tabares | H04L 61/1511 |
| 10,362,057 B1* | 7/2019 | Wu | H04L 63/1408 |
| 10,791,085 B2* | 9/2020 | Thakar | H04L 61/10 |
| 2008/0155694 A1 | 6/2008 | Kwon et al. | |
| 2014/0283063 A1 | 9/2014 | Thompson et al. | |

OTHER PUBLICATIONS

Bruneau, "DNS Sinkhole," SANS Institute InfoSec Reading Room, Aug. 7, 2010. 42 pages.

\* cited by examiner

*Primary Examiner* — Longbit Chai
(74) *Attorney, Agent, or Firm* — Wilmer Cutler Pickering Hale and Dorr LLP

(57) ABSTRACT

A computer implemented method for resolving a Domain Name System, DNS, query received at a third party cloud computing environment comprises: receiving a DNS query at the third party cloud computing environment. The DNS query is forwarded to a sinkhole DNS server if the DNS query comprises an unauthorised domain name. The DNS query is forwarded to a default DNS server of the third party cloud computing environment if the DNS query does not comprise an unauthorised domain name.

20 Claims, 8 Drawing Sheets

DOMAIN NAME SECURITY IN CLOUD COMPUTING ENVIRONMENT

TECHNICAL FIELD

The present invention relates to controlling Domain Name System (DNS) security in a cloud computing environment.

BACKGROUND

Third party cloud computing environments provide off-site computing resources for storing and processing data. A third party cloud computing environment provides access to operators and users of the data via the internet. Example third party computing environments include Amazon Web Services (AWS), Microsoft Azure, Google Cloud Platform, and IBM Cloud.

One or more organisations (hereinafter a "first party") is typically responsible for the provision of the data that is stored in the third party cloud environment and for how that data is to be processed. Data is transferred to the third party cloud environment using a secure internet connection. The first party may wish to grant access to its data to one or more additional users (hereinafter a "second party") via the third party cloud environment. For example, a second party may be permitted to access (e.g. read and/or read/write), and/or process the stored data.

If the data is of a sensitive nature, e.g. a user's personal data, processing of the sensitive data in the third party cloud environment must not allow the data to be compromised. The first party would not typically permit the second party to send its data to an unauthorised external domain on the internet. The first party may use existing security provisions of the cloud environment to restrict certain functionality of the computing environment to ensure the transfer of data to unauthorised domains does not occur. However, this must be balanced against a requirement for the second party to have unfettered access to all of the third party cloud environment's computing resources and associated functionality.

As mentioned above, the second party requires full access to the third party cloud environment's resources. The resources include the third party cloud environment's routing protocols/resources, notably information such as the cloud environment's default/native Domain Name System, DNS, server. A vulnerability can arise in the event that a second party uses the native/default DNS server of the third party cloud environment to create a malicious DNS tunnel for the sensitive data. The malicious DNS tunnel could be used to transfer the sensitive data to an unauthorised domain. Preventing use of native/default DNS servers entirely would mean that the second party might not be able to communicate effectively with an internal and/or external domain, irrespective of whether the domain is authorised.

There is thus a balance to be struck between the first party providing full access to its data and not unduly restricting the DNS server functionality of the third party cloud environment for the second party.

SUMMARY

In one aspect, there is a method for resolving a Domain Name System, DNS, query received at a third party cloud computing environment, the method comprising receiving a DNS query at the third party cloud computing environment, forwarding the DNS query to a sinkhole DNS server if the DNS query comprises an unauthorised domain name, and forwarding the DNS query to a default DNS server of the third party cloud computing environment if the DNS query does not comprise an unauthorised domain name. This means that DNS tunnelling/exfiltration attempts to unauthorised domains are prevented.

The sinkhole DNS server may be implemented in the third party cloud environment. This means any sensitive data cannot be transmitted from the third party cloud computing environment to an unauthorised domain.

The sinkhole DNS server may not respond with a message that indicates a domain is not found. This means that a malicious party attempting a DNS exfiltration attempt does not detect security provisions preventing such attempts.

The sinkhole DNS server may respond to the DNS query with a message that indicates the DNS query completed successfully (NOERR) or with a message that indicates there is no answer to the DNS query (NOANS). This means network and DNS server strain are minimised.

Following the response of the sinkhole DNS server, an alert may be generated at the third party environment. This means that DNS tunnelling/exfiltration attempts can be identified and acted upon.

The method may further comprise prior to forwarding the DNS query to a sinkhole DNS server if the DNS query comprises an unauthorised domain name, determining whether the DNS query comprises an address in a whitelist, and upon determining that the address is not in the whitelist, forwarding the DNS query to the sinkhole DNS server. This may comprise prior to forwarding the DNS query to a default DNS server of the third party cloud computing environment if the DNS query does not comprise an unauthorised domain name, determining whether the DNS query comprises an address in a whitelist, and upon determining that the address is in the whitelist, forwarding the DNS query to the default DNS server. This means that an administrator of the third party cloud computing environment can readily list authorised domains via the whitelist, and thus ensure only DNS queries corresponding to an authorised domain can be resolved.

The method may further comprise applying forwarding rules to the DNS query. This may comprise determining whether the DNS query comprises an authorised external domain name, and forwarding the DNS query to the default DNS server of the third party cloud environment if the DNS query comprises an authorised external domain name, wherein optionally the default DNS server comprises a DNS server in a shared access area, and wherein optionally, the method further comprises determining that the DNS query comprises an authorised external domain name if the DNS query comprises an address in a whitelist. This may also comprise determining whether the DNS query comprises a local address, and forwarding the DNS query to the native DNS server of the third party cloud environment if the DNS query comprises a local address, wherein optionally the default DNS server comprises a DNS server in an area local to the local address, and wherein optionally, the method further comprises determining the DNS query comprises a local address if the DNS query comprises an address in a whitelist. This may comprise determining whether the DNS query comprises a shared access area of the third party cloud computing environment, and forwarding the DNS query to the native DNS server of the third party cloud environment if the DNS query comprises a shared access area of the third party cloud computing environment, wherein optionally, the default DNS server comprises a DNS server in the shared access area, wherein optionally the method further comprises determining the DNS query comprises a shared access area if the DNS query comprises an address in a whitelist.

This may also comprise determining whether the DNS query comprises an unauthorised domain name, forwarding the DNS query to the sinkhole DNS server if the DNS query comprises an unauthorised domain name, wherein optionally the sinkhole DNS server comprises a sinkhole DNS server in the shared access area, and wherein optionally the method further comprises determining the DNS query comprises a local address if the DNS query comprises an address in a whitelist. These forwarding rules increase the resilience of the cloud computing environment to malicious DNS tunnelling attacks.

The third party cloud computing environment may comprise a plurality of user account areas accessible by respective users, wherein each user account comprises the forwarding rules. This means that a DNS query originating in a user account cannot be used for malicious DNS tunnelling attacks.

Each user account area may comprise a DNS server that can act as the default DNS server. This means the DNS query can be resolved within the user account area and thus avoid further network traffic to a DNS server that is located elsewhere.

The sinkhole DNS server may be located in a shared access area of the third party cloud computing environment, wherein each user account area can access the shared access area, wherein optionally the shared access area comprises a DNS server that can act as the default server. This means that each user account can forward DNS queries as the situation requires.

The third party cloud computing environment may restrict or throttle DNS query traffic or restrict a burst size of DNS query traffic. This means that repeated DNS attempts that could otherwise overburden (i.e. excessive network traffic and/or DNS server strain) the third party cloud computing environment are constrained.

The third party cloud computing environment may generate an alert in response to a DNS exfiltration attempt, wherein optionally the third party cloud computing environment scans logs to identify a DNS exfiltration attempt, wherein optionally upon detection of a DNS Exfiltration attempt, the third party cloud computing environment isolates, snapshots and terminates an instance that resulted in detection of the DNS Exfiltration attempt. This means that further DNS tunnelling/exfiltration attempts of the same nature can be prevented.

The default DNS server may be configured to provide the DNS sinkhole server. This means that an existing third party cloud computing environment requires minimum modification to implement the invention.

In one aspect there is provided a cloud computing environment comprising processing circuitry which is configured to execute computer executable code, that when executed, performs the steps of any preceding method.

In one aspect, there is provided a system comprising one or more computing devices comprising computer executable code, that when executed by the one or more computing devices, performs the steps of any preceding method.

In one aspect, there is provided a computer program comprising computer executable code, that when executed on a computing device, performs all the steps of the preceding method.

BRIEF DESCRIPTION OF DRAWINGS

The present invention is described with reference to one or more exemplary embodiments as depicted in the accompanying drawings, wherein.

DETAILED DESCRIPTION

Figure 1:
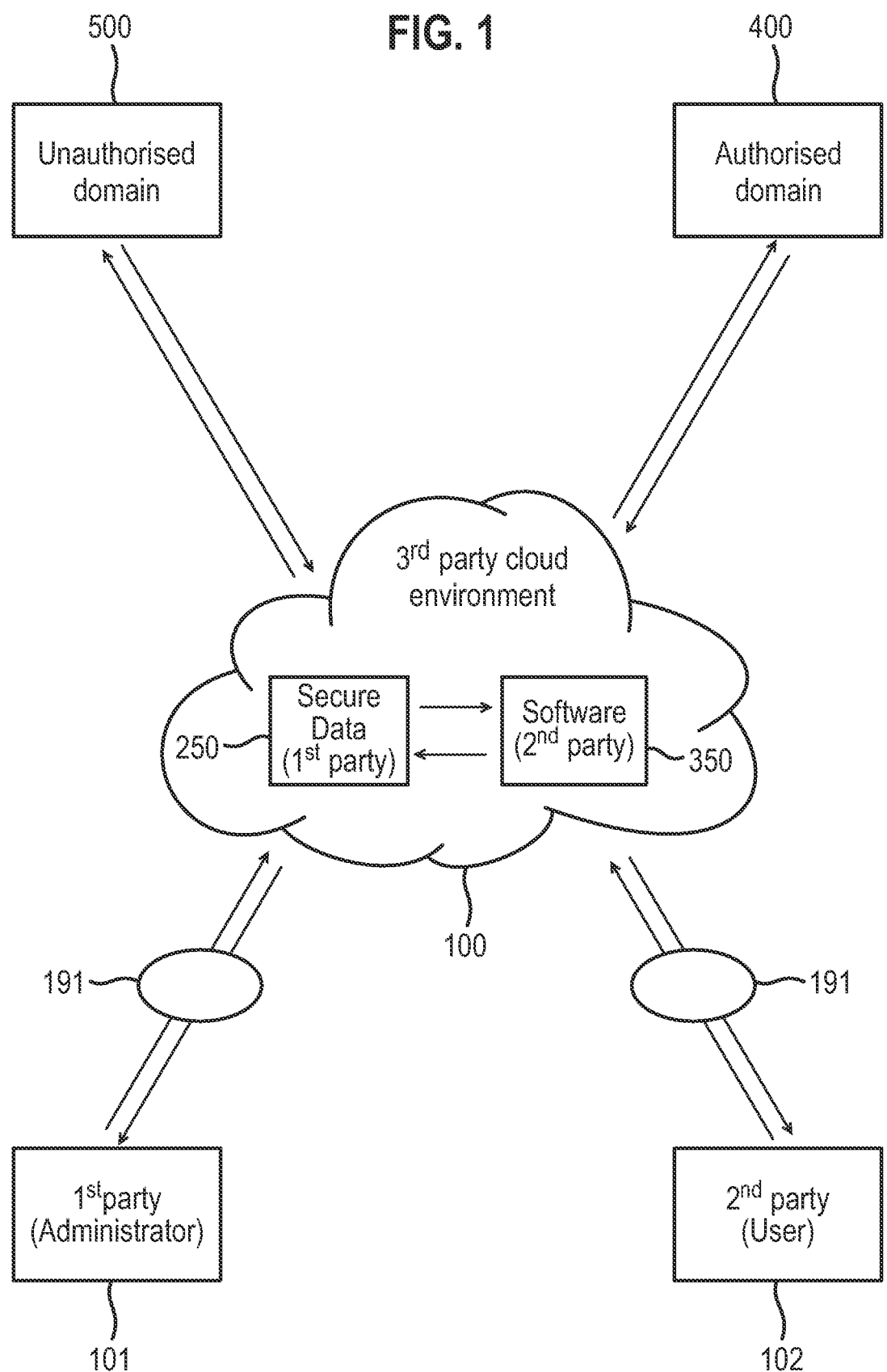
FIG. 1 is a schematic view of a third party cloud computing environment.

FIG. 1 depicts a third party cloud computing environment 100 and how it is used by a first party 101 to provide its secure data for access by a second party 102. The second party 102 may be one of a plurality of users who are each able to access the computing environment 100. Each second party 102 has access to its allocated secure data provided by the first party, such as user account data and associated confidential data; this secure data being accessible only to the first party and the second party to whom the data has been allocated, and it is inaccessible to other parties, such as other users of the plurality of users. The first party 101 uploads its secure data 250 to the third party cloud computing environment 100 via a secure link 190.

The first party 101 is a reference to a first organisation handling secure data, for example sensitive or confidential data. The first party 101 may be one or more computing resources, such as one or more computing devices (e.g. servers) full under the control of the first organisation. The second party 102 is a reference to a second organisation, different to the organisation of the first party, which has access to the first' party's secure data. The second party 102 may be one or more computing resources, such as one or more computing devices (e.g. servers) full under the control of the second organisation.

The first party 102 has full administrative privileges with respect to how its secure data 250 is to be accessed via and processed within the third party cloud computing environment 100. The cloud computing environment 100 is configured to permit the first party 101 to grant access to its secure data 250 by a second party 102 by creating a user account for the second party 102 within the cloud computing environment 100. Once this user account has been created, the second party can connect to the cloud computing environment 100 via a secure link 191 over the internet to access the secure data. The user account is configured additionally to permit the second party 102 to have access to computing resources located within the third party computing environment 100, and execute their dedicated processes 350 within the environment 100 on the secure data 250 provisioned by the first party 101. Such dedicated processes are typically configured to transmit the secure data 250 to an internal or external domain 400, 500. The computing environment 100 may be configured by the first party 101 to restrict the domains to which the secure data may be transmitted, i.e. to one or more authorised domains 400 only. Moreover, individual user accounts of the second parties may be configured by the first party 101 to restrict the onward transmission of secure data on an individual account basis. Any attempt to send the secure data 250 to an unauthorised domain 500 for a second party 102 having a restricted user account will be prevented.

Figure 2:
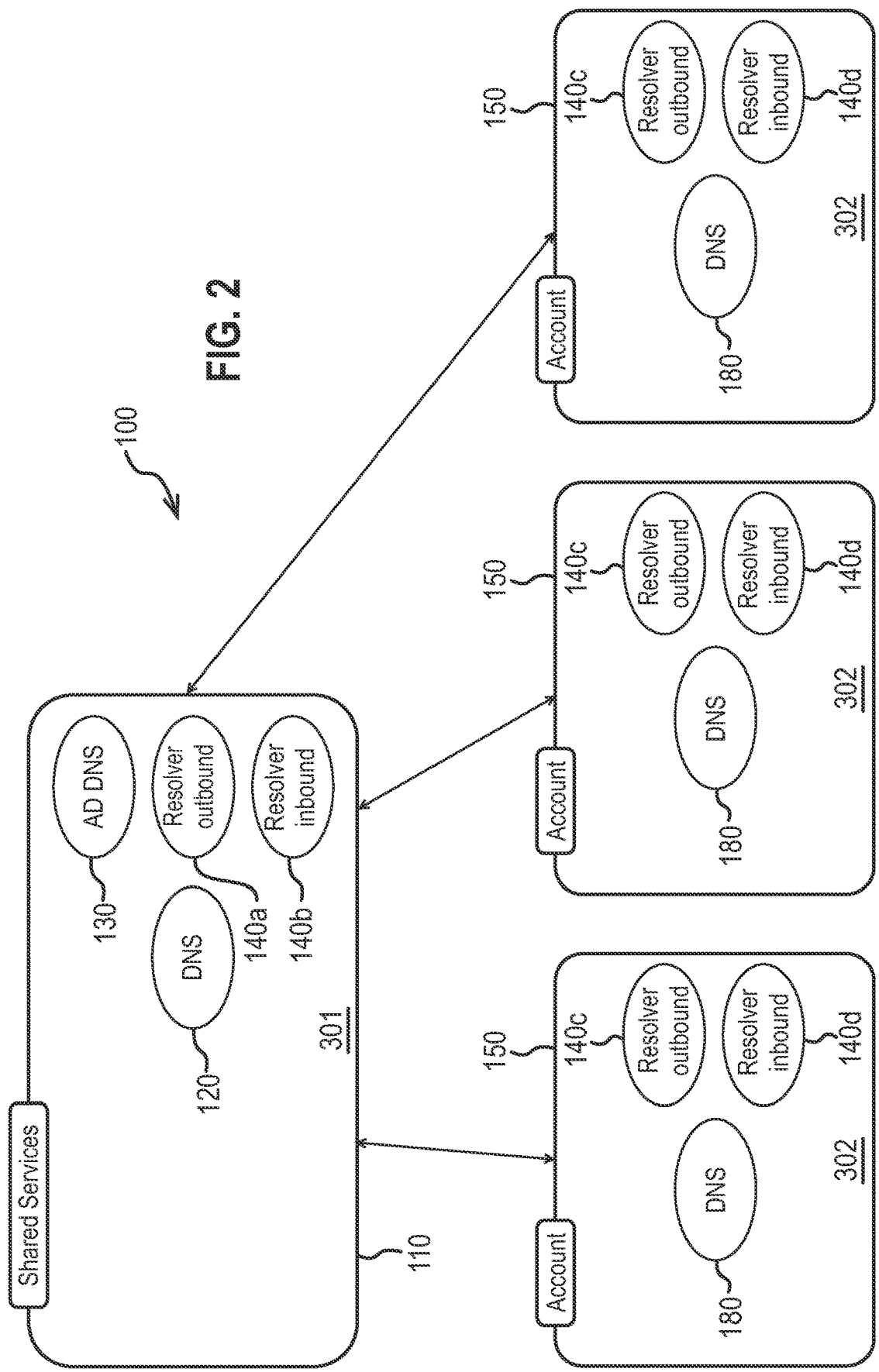
FIG. 2 is a schematic view of user services provided by the third party cloud computing environment of FIG. 1.

Requests to send data to an internal or external domain are handled using a native Domain Name System, DNS, server 120, 180 of the cloud computing environment 100 (see FIG. 2). There may be one or more native DNS servers 120, 180 configured within the cloud computing environment 100. The native DNS server 120, 180 receives a request to resolve the address (typically an IP address) of the internal or external domain to which data is to be sent. In particular, the native DNS server 120, 180 receives a DNS query, which is a request for the IP address of a domain. The DNS server looks up the domain in its DNS database, and if it can resolve an associated IP address for the domain, it responds with the IP address that corresponds to the DNS query. Ideally, only DNS queries that correspond to authorised external domains 400 should be resolved by the DNS server. The cloud computing environment 100 may offer security provisions to prevent access to the DNS server to only those with administrator privileges. That is the first party 101 can set the types of DNS queries that may be resolved by the DNS server. Hence, a user account can only access data with certain DNS queries, i.e. ones that correspond to external domains authorised by the first party 101.

In conventional cloud computing environments, a compromised user account may be able to circumvent any the above security provisions and gain access to the native DNS server 120 and modify it so that it can resolve any DNS query, including ones that correspond to unauthorised external domains. The first party's secure data 250 can then be sent to an unauthorised domain 500. This means that secure data 250 can be sent unknowingly to an unauthorised domain 500.

FIG. 2 illustrates a cloud computing environment 100 that may be used by first and second parties 101, 102 as described above based on native DNS servers 120, 180 configured within the cloud computing environment 100. FIG. 2 depicts a conceptual arrangement of an exemplary cloud computing environment 100 in respect of the DNS servers 120, 180, and illustrates an arrangement of logically isolated processing segments 301, 302 providing various aspects of the functionality of the cloud computing environment 100. Additionally, the native DNS servers 120, 180 and other processing components, such as inbound/outbound resolvers 140, may be configured as logical processing segments within the segments 301, 302. All logical processing segments can be configured as virtual computing devices within the cloud computing environment 100. Accordingly, the cloud computing environment 100 may be configured with various alternative arrangements of the logically isolated processing segments.

In FIG. 2, the cloud computing environment 100 comprises a shared services or access area 110 common to all user accounts of the cloud computing environment 100. The shared services or access area 110 is one logically isolated processing segment 301 (e.g. a virtual private cloud) accessible to other private logical segments 302. Each user account area is a sub domain to the domain that is the shared services area 110. Typically, the shared services area 110 provides the native DNS server of cloud computing environment 100. The native DNS server 120 is the primary DNS resolver for all user accounts within the cloud computing environment 100. Advanced directory, AD DNS servers 130 can also be provided in the shared services area 110 to respond to requests for an AD DNS domain.

The shared services area 110 comprises both an outbound resolver 140a and an inbound resolver 140b to direct inbound and outbound requests to and from the shared services area respectively. For example, a DNS query originating outside the shared services area but directed to the DNS server 120 in the shared services area will arrive at the inbound resolver 140b which then forwards the DNS query to the DNS server 120. Similarly, after resolving the DNS query, the DNS server 120 sends, for example, the IP address corresponding to the DNS query to the outbound resolver 140b. The outbound resolver 140b then sends the IP address to the source of the corresponding DNS query that was received at the inbound resolver 140b.

Additionally, the cloud computing environment 100 contains a number of user account areas 150. As mentioned above, each user account area 150 is typically a unique sub domain to the domain that is the shared services area 110. Each user account area 150 is a logically isolated processing segment 302 (e.g. a virtual private cloud). Each user account area 150 may be further sub-divided into a plurality of local accounts. The local accounts are local in the sense that they share the same sub-domain and can be accessed internally with local account name resolution.

Each user account area 150 further contains a further local native DNS server 180 that may be used to resolve DNS queries for local accounts within the user account area 150. Therefore, each user account 150 can be used to access local accounts via the local native server or any domain external to the user account via the native DNS server in the shared services or access area. In this regard, the external domain is with respect to the user account and could correspond to either a domain internal to the cloud computing environment 100, but external to the user account area 150, or entirely external to the computing environment 100.

Each user account area 150 also contains both an outbound resolver 140c and an inbound resolver 140d to direct inbound and outbound requests to and from each user account area respectively. For example, a DNS query originating outside the user account area but directed to the DNS server 180 in the user account area will arrive at the inbound resolver 140d which then forwards the DNS query to the DNS server 180. Similarly, after resolving the DNS query, the DNS server 180 sends, for example, the IP address corresponding to the DNS query to the outbound resolver 140c. The outbound resolver 140c then sends the IP address to the source of the corresponding DNS query that was received at the inbound resolver 140d.

As mentioned above, the first party 101, as administrator of the cloud computing environment 100, would typically restrict the native/default DNS servers 120, 180 to prevent unauthorised transfer of its secure data to unauthorised domains 500. For example, access to a routing table of the native DNS server is not granted to the second party 102. This way, only authorised routing channels can be used via the native DNS servers 120, 180. Even with such restrictions, a compromised account of the second party 102 may still be able to run malicious software that could amend the routing table to enable data exfiltration to an unauthorised domain 500. In such a case, the routing table could be updated to respond to a DNS query for an unauthorised domain 500 by providing the required routing path for the unauthorised domain. Not only would secure data be compromised, but the first party 101 would have no knowledge of the compromise since the native/default server would be functioning as expected, i.e. resolving DNS queries in accordance with the routing table.

Figure 3:
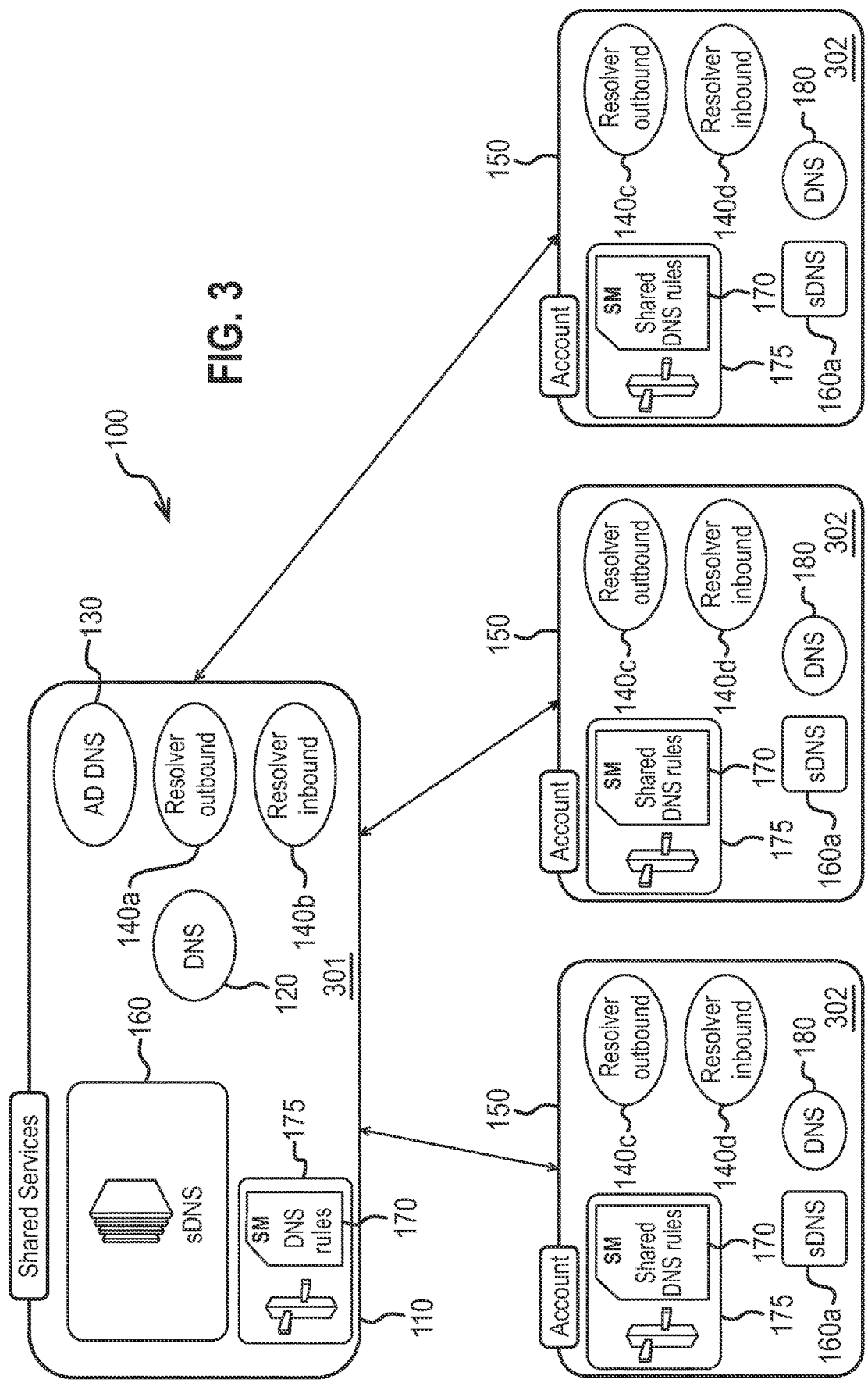
FIG. 3 is a further schematic view of user services provided by the third party cloud computing environment of FIG. 1.

In accordance with the present invention, the cloud computing environment 100 is configured to prevent and/or detect such attacks. As shown in FIG. 3, DNS sinkhole functionality via server 160 is provided within the cloud computing environment 100.

The DNS sinkhole server 160 responds to DNS queries with false information. The false information frustrates any attempts to connect to an authorised domain. For example, and as will be explained in further detail below, the DNS sinkhole server 160 responds to a query for an unauthorised domain whilst also preventing a connection to the unauthorised domain. This way, a malicious party using the compromised user account of the second party 102 might persist in sending DNS queries that are seemingly resolved. However, the queries are only ever resolved in a manner that prevents a connection to an unauthorised domain. Allowing the user to persist in its attempts is important since this can help with the identification and isolation of any compromised user accounts running malicious software.

The DNS sinkhole server 160 is located in the shared services area 120. Both the shared services or access area and the user account areas each contain a security module 175 which implements conditional forwarding rules 170 to forward DNS queries to prevent and/or detect malicious attacks.

The security module 175 implements a forwarding rule 170 according to the invention which can used by the cloud computing environment 100 to govern all DNS queries. This forwarding rule 170 processes DNS queries so as to forward a DNS query to the DNS sinkhole server 160 if the DNS query comprises an unauthorised domain name. In addition, a DNS query will be forwarded to the associated relevant (local or shared) native DNS server 120, 180 of the cloud computing environment 100 if the DNS query does not comprise an unauthorised domain name.

Figure 4:
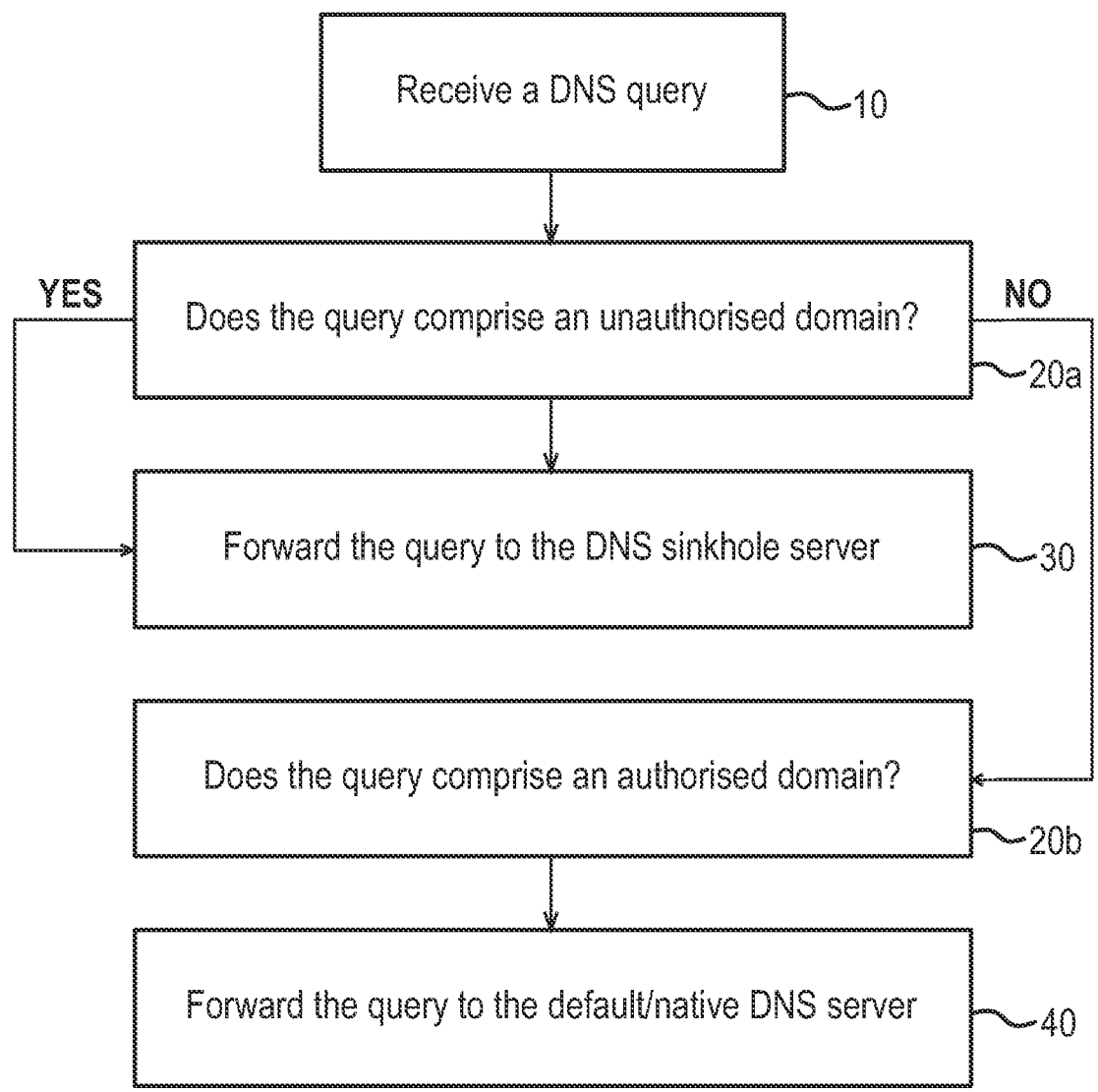
FIG. 4 is a flow diagram of a process performed by the third party cloud computing of FIG. 1.

A process for implementing this general forwarding rule is depicted in FIG. 4. As shown by FIG. 4, a DNS query is received 10 within the cloud computing environment 100. The DNS query is then processed according to the query determination procedure set out below. Significantly, the DNS query is forwarded 30 to the sinkhole DNS server 160 if the DNS query comprises an unauthorised domain name 20a. Alternatively, the DNS query is forwarded 40 to a native DNS server 120, 180 of the cloud computing environment 100 if the DNS query does not comprise an unauthorised domain name 20b.

A source (i.e. client) that generates the DNS query in the absence of a response from a DNS server will re-submit the DNS query a predetermined number of times until either it receives a response or deduces that the DNS server receiving the query has timed out. The DNS sinkhole server 160 will not resolve a DNS query with a response that provides an IP address corresponding to the DNS query. In absence of such a response, the source of the DNS query will resubmit the DNS query until either it receives a response or deduces that DNS server timeout has occurred. Accordingly, in the event that the DNS query is routed to the DNS sinkhole server 160, the DNS query should be resolved so that the response is either a message that indicates that the DNS query completed successfully (NOERR), or a message that indicates there is no answer to the DNS query (NOANS). This way, a DNS query that comprises an unauthorised domain will be resolved in a cloud computing environment, albeit without providing an IP address that corresponds to the unauthorised network domain and instead providing an unrouteable or different IP address. Network traffic and DNS server strain due to re-submitted DNS queries can thus be avoided.

Additionally, the DNS sinkhole server 160 can be configured to prevent a response to a DNS query that comprises a message that indicates that the domain is not found or that it does not exist (NXDOMAIN). This not only prevents re-submitted DNS queries, and thus unnecessary network/server burden, but it also avoids flagging to the malicious party that a security breach to the unauthorised domain had been identified. For example, the malicious party will expect the DNS query to correspond to a valid IP address. In particular, the DNS query could have a corresponding entry in a widely accessible DNS server, e.g. an external third party DNS server, which is not provisioned by the third party cloud computing environment. Testing outside the third party cloud computing environment 100 would result in the DNS query being readily resolved. A malicious party may therefore conclude that the only reason its malicious DNS query has not been resolved (i.e. when it receives an NXDOMAIN message) in the third party cloud computing environment 100 is that security measures are in place. The malicious party may therefore cease the DNS exfiltration attempt and attempt to modify its approach to data exfiltration to compromise the cloud computing environment's security by other means. As will be explained below, it can be useful to allow repeated DNS exfiltration attempts to occur so that they can be identified and isolated. Therefore, preventing return of an NXDOMAIN message increases the likelihood of repeated attempts occurring.

When the DNS sinkhole server 160 is requested to resolve a DNS query, the cloud computing environment 100 generates an alert to the first party 101. This alert is indicative of the attempt to establish a connection to an unauthorised domain.

DNS Query Routing Determination

One procedure for determining where a DNS query, being processed within the cloud computing environment 100, should be routed (i.e. a native DNS server 120, 180 or the DNS sinkhole server 160) is as follows. Prior to forwarding the DNS query, the security module 175 via forwarding rule 170 determines whether the DNS query comprises an address in a whitelist stored within or accessible by security module 175. This whitelist is configured and controlled by the first party 101. If the address is not in the whitelist, the DNS query is forwarded to the DNS sinkhole server 160. Alternatively, if the address is identified in the whitelist, the DNS query is forwarded to a default DNS server 120, 180. Although the security module 175 and whitelist is shown as being located in the shared services or access area 110, the security module 175 and/or whitelist can also be located in each user account area 150. The security module 175 and/or whitelist can be integrated into the native DNS servers 120, 180 and/or the DNS sinkhole server 160 themselves.

Advantageously, the security module 175 can act as a master/primary security module to subordinate slave/secondary security modules in each user account area. The white list stored within or accessible by the master/primary security module 175 provides an authoritative whitelist which can be disseminated to the whitelists stored within or accessible by the subordinate slave/secondary security modules. Each time the whitelist stored within or accessible by the master/primary security module 175 is updated by the first party, the updated whitelist can be provided with a version number. The updated whitelist and version number are shared and synchronised with each subordinate slave/secondary security modules. Before acting on a DNS query, each slave/secondary security module can first contact the master/primary security module 175 to check if the respective version numbers correspond. If the versions do not correspond, the DNS query is not acted on until the whitelists are resynced so that the version numbers correspond. This prevents a scenario of resolving an entry present in a slave/secondary master whitelist when the entry has been removed from the master/primary whitelist. Accordingly, no matter where a DNS query arises in the third party cloud computing environment, it will be resolved in the same manner.

In an alternative or in addition to the whitelist implementation described above, a blacklist can be provided. The blacklist can be thought of as an inverse whitelist where entries on the blacklist correspond to unauthorised domains. The blacklist can be checked instead of or in addition to the white list when a DNS query is generated. When the blacklist is used instead of the whitelist, DNS queries corresponding to entries other than those in the blacklist should be resolved. When the blacklist is used in addition to the whitelist, a DNS query most both correspond to an entry in the whitelist and not correspond to an entry in the blacklist before it can be resolved. This provides a double check on each DNS query before it is resolved. In the event of a conflict where the whitelist and blacklist both contain an IP address corresponding to a DNS query indicating that it should and should not be resolved respectively, the blacklist is authoritative. This means that an addition to the whitelist will not result in the resolution of a DNS query corresponding to the addition until a corresponding deletion has been made to the blacklist. Requiring both the whitelist and blacklist to be updated before permitting a new DNS query to be resolved increases security.

Figure 5:
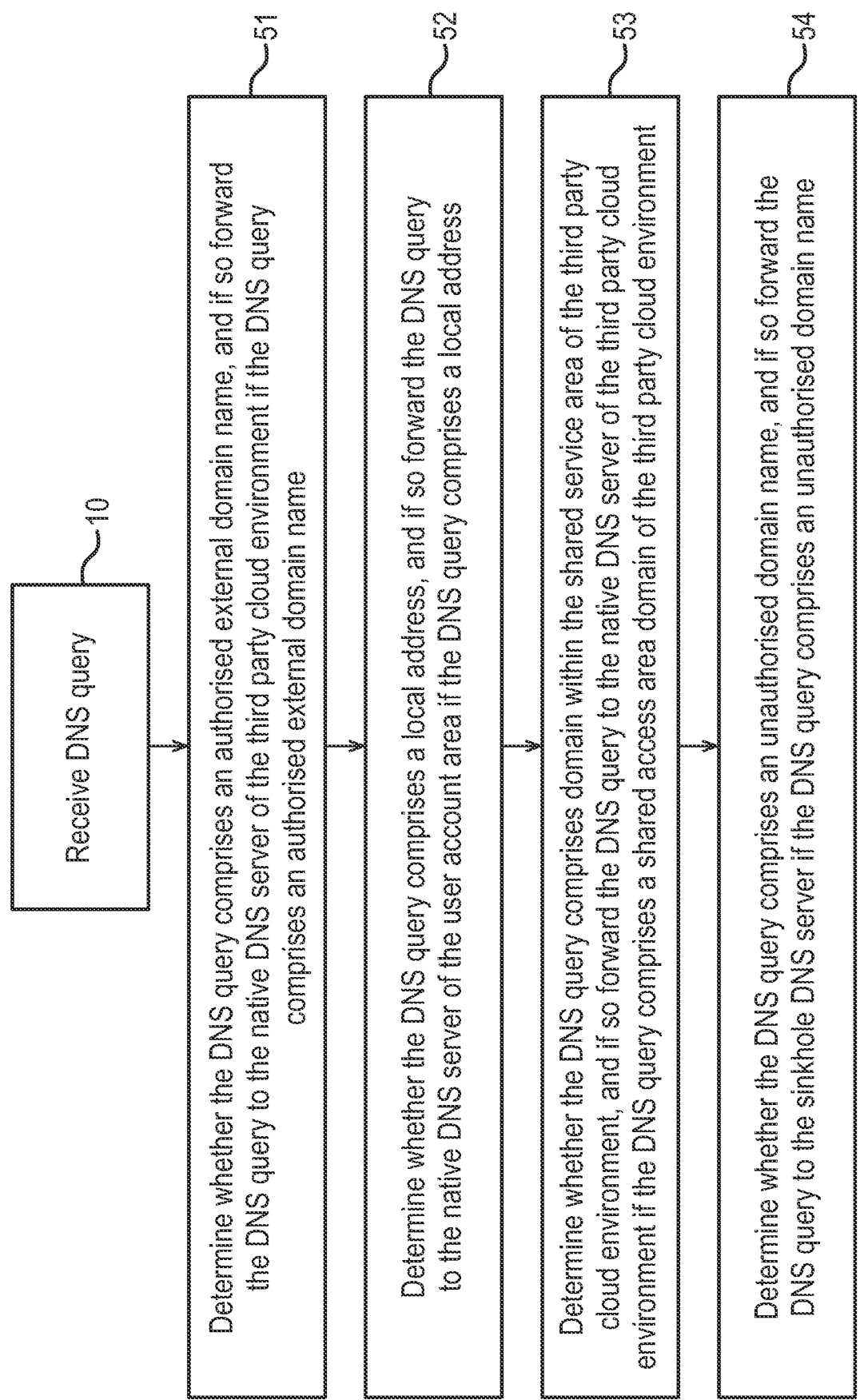
FIG. 5 is a flow diagram of conditional forwarding rules implemented by the third party cloud computing environment of FIG. 1.
Figure 6:
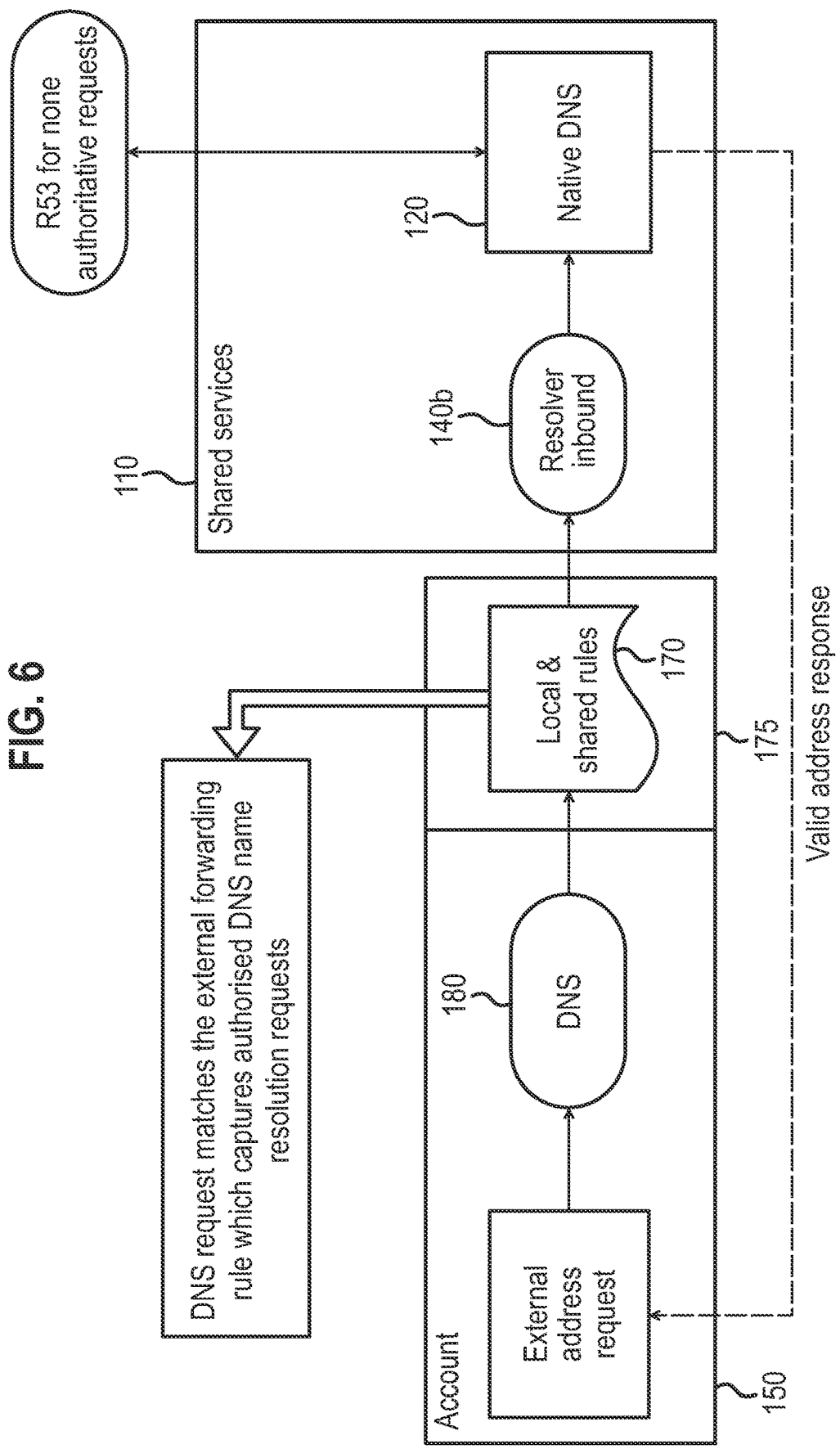
FIGS. 6 to 8 are further flow diagrams of the conditional forwarding rules of FIG. 5.
Figure 7:
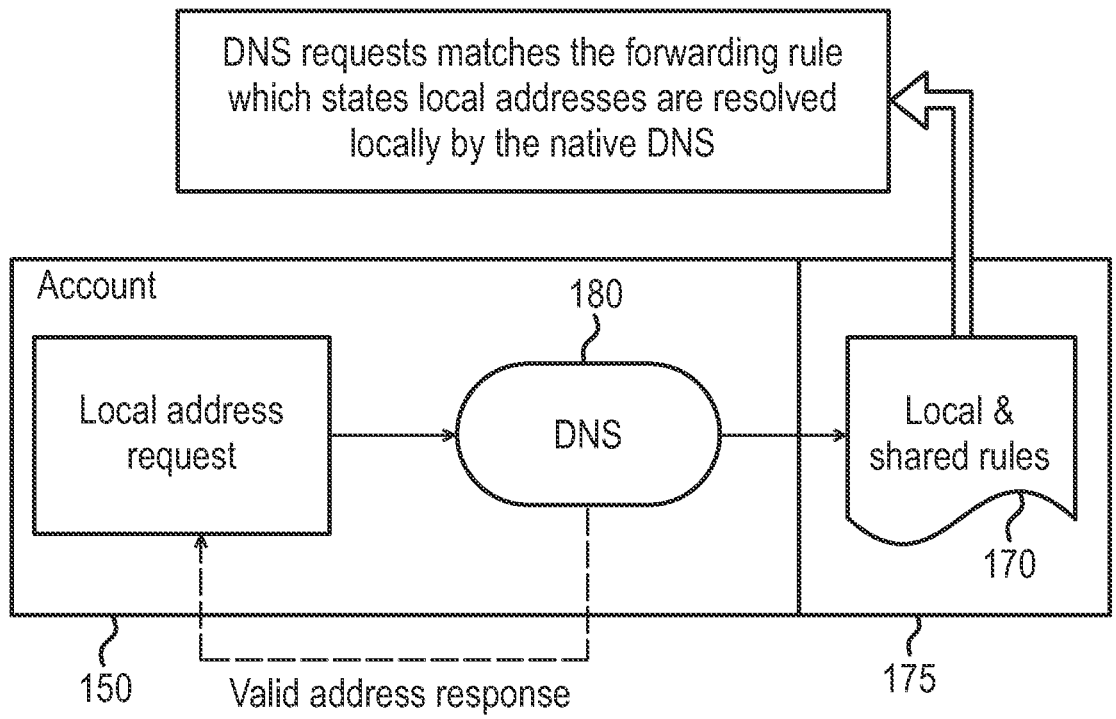
Figure 8:
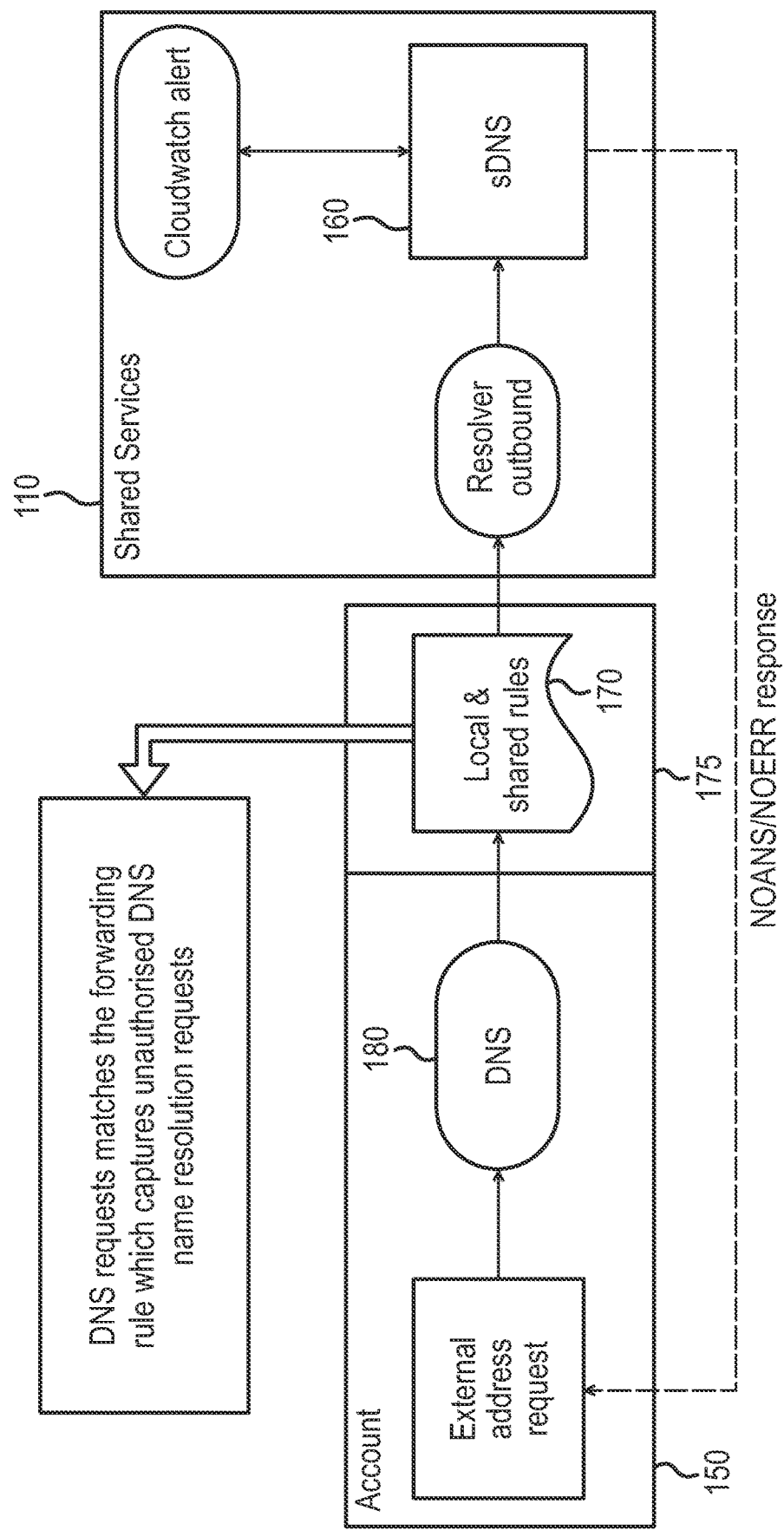

In addition or in place of the forwarding rule 170 described above, conditional forwarding rules may be implemented by the security module 175 to increase further the resilience of the cloud computing environment 100 to malicious DNS tunnelling attacks. These conditional forwarding rules are shown in FIG. 5. These rules do not have to be executed in any particular order, rather they are applied until a particular forwarding condition is met. With conditional forwarding, a DNS query arising in the cloud computing environment 100 is forwarded in accordance with one or more, or all of the following conditions:

1. Determining 51 whether the DNS query comprises an authorised external domain name, and forwarding the DNS query to the native DNS server of the third party cloud computing environment 100 if the DNS query comprises an authorised external domain name. Typically, the native DNS server in this instance is the DNS server 120 of the shared services or access area 110. The determination as to whether the DNS query comprises an authorised external domain can involve the use of the whitelist in the way mentioned above. An example of the execution of this forwarding rule is depicted in FIG. 6.
2. Determining 52 whether the DNS query comprises a local address within the user account area 150, and forwarding the DNS query to the native DNS server of the cloud computing environment 100 if the DNS query comprises a local address. Typically, the native server in this instance is the DNS server 180 in an area 150 local to the local address (i.e. the one in the user account to which the local address belongs). The determination as to whether the DNS query comprises a local address can involve the use of the whitelist mentioned above. An example of the execution of this forwarding rule is depicted in FIG. 7.
3. Determining 53 whether the DNS query comprises an address within the shared service or access area 120 of the cloud computing environment 100, and forwarding the DNS query to the native DNS server 120 of the cloud computing environment 100 if the DNS query comprises an address within the shared access area of the third party cloud environment. Typically, the native server in this instance is the DNS server 120 in the shared access area. The determination as to whether the DNS query comprises the shared access area can involve the use of the whitelist mentioned above.
4. Determining 54 whether the DNS query comprises an unauthorised domain name, and forwarding the DNS query to the sinkhole DNS server (sDNS) 160, 160a if the DNS query comprises an unauthorised domain name. Typically, the sinkhole DNS server 160 is located within the shared access area 110. The determination as to whether the DNS query comprises an unauthorised domain can involve the use of the whitelist mentioned above. An example of the execution of this forwarding rule is depicted in FIG. 8.

The above conditional forwarding rules enable typical usage scenarios for when a first party 101 provides access to secure data to a second party 102 via the third party cloud computing environment 100. Accordingly, any attempt to establish a connection to an unauthorised domain via the cloud computing environment 100 is prevented. In addition, all conventional functionality of the third party cloud computing environment 100 is preserved, at least from the perspective of the external second party 102.

Forwarding rules 170 and/or security module 175 can be located in either or both the shared services or access area 110, and the user account areas 150. If in both, this ensures that all DNS queries are dealt with as expected, irrespective of where they may originate.

Both the default DNS servers 120, 180 and the DNS sinkhole server 160 are configured to maintain a data log of all DNS queries which they receive. The frequency and total number of attempts can be determined by the security module 175 analysing each DNS query, for example the requested domain (e.g. domain name or URL) and time of request data can be analysed. This way, the security module 175 is configured to identify any malicious exfiltration attempts by scanning the DNS query data logs. For example, repeated requests to connect to the same domain, or any unauthorised domain, will be flagged after a scan of the DNS servers' and DNS sinkhole server's DNS query data logs. Upon detection of a DNS exfiltration attempt from the data logs, the third party cloud computing environment 100 isolates, snapshots, and terminates an instance that resulted in detection of the DNS Exfiltration attempt. An appropriate alert is also generated which contains all of the relevant information such as time of attack and target domain.

Independently, or in response to a scan of the DNS query data logs, the security module 175 is configured to reduce the likelihood of successful DNS tunnelling attack. For example, based on detection of malicious attack, or detection of a likely malicious attack, the default DNS servers 120, 180 and the DNS sinkhole server 160 can be instructed by the security module 175 to restrict or throttle DNS query traffic. In addition, the default DNS servers 120, 180 and the DNS sinkhole server 160 can be instructed to restrict a burst size of DNS query traffic. These measures in addition to the above described third party cloud environment with a DNS sinkhole server can greatly reduce the likelihood of a malicious user being able to compromise secure data.

Figure 9:
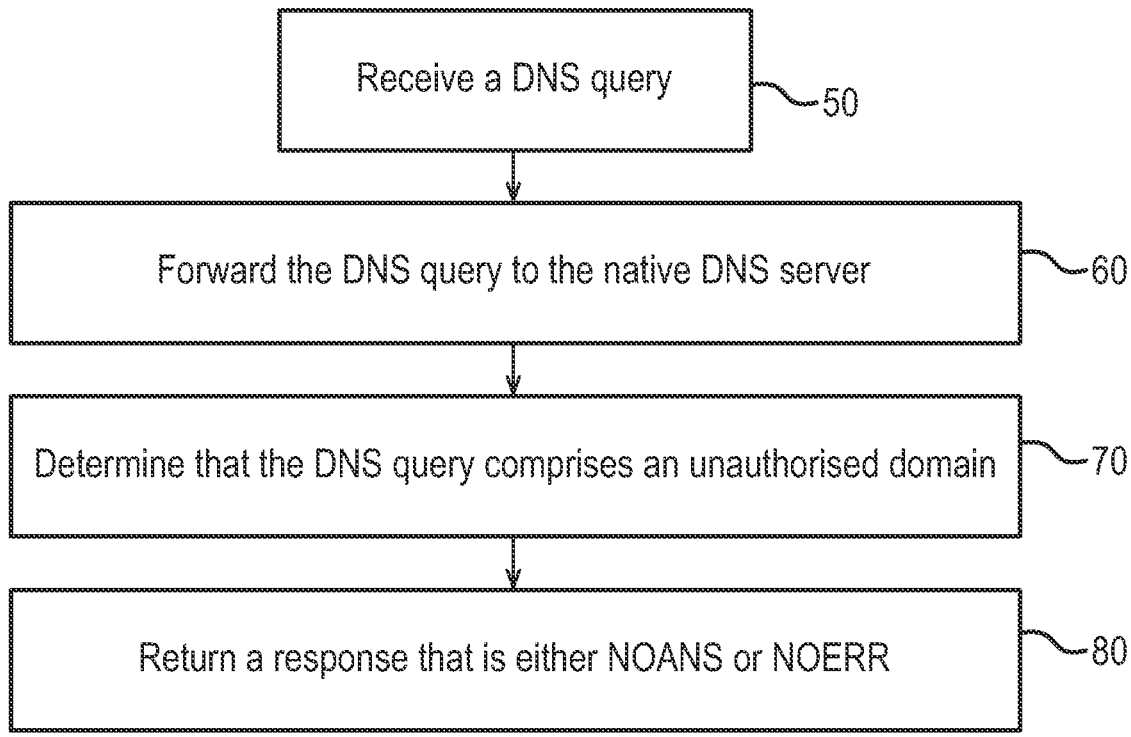
FIG. 9 is a flow diagram of an alternative process performed by the third party cloud computing of FIG. 1.

The skilled person will appreciate that the above processes and system can be modified in various ways according to given deployment scenarios. For example, rather than set up a dedicated DNS sinkhole server, the native DNS server 120, 180 can be modified to integrate the DNS sinkhole server itself, such that in the event a DNS query for an unauthorised domain is received, the following process is then carried out entirely within the native DNS server 120, 180, as illustrated in FIG. 9. As shown in FIG. 9, a DNS query is received 50 at the third party cloud computing environment. The query is then forwarded 60 to the native DNS server 120, 180 which is additionally configured with sinkhole DNS server functionality, as explained above. If the DNS query comprises an unauthorised domain 70, the sinkhole DNS server, integrated within the native DNS server 120, 180, returns 80 a response that is either a message that indicates that the DNS query completed successfully (NOERR), or a message that indicates there is no answer to the DNS query (NOANS), as explained above.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention can take the form of an entirely hardware embodiment, an entirely software embodiment or an embodiment containing both hardware and software elements. In a preferred embodiment, the invention is implemented in software.

Furthermore, the invention can take the form of a computer program embodied as a computer-readable medium having computer executable code for use by or in connection with a computer. For the purposes of this description, a computer readable medium can be any tangible apparatus that can contain, store, communicate, propagate, or transport the program for use by or in connection with the computer. Moreover, a computer-readable medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The flow diagrams in the figures illustrate the architecture, functionality, and operation of possible implementations of methods according to various embodiments of the present invention. In this regard, each block in the flow diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the flow diagrams, and combinations of blocks in the flow diagrams, can be implemented by special purpose hardware-based systems that perform the specified functions or acts, or combinations of special purpose hardware and computer instructions.

It will be understood that the above description of is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

Embodiments

1. A method for resolving a Domain Name System, DNS, query received at a third party cloud computing environment, the method comprising:

receiving a DNS query at the third party cloud computing environment;

forwarding the DNS query to a sinkhole DNS server if the DNS query comprises an unauthorised domain name; and forwarding the DNS query to a default DNS server of the third party cloud computing environment if the DNS query does not comprise an unauthorised domain name.

2. The method of embodiment 1, wherein the sinkhole DNS server is implemented in the third party cloud environment.

3. The method of embodiment 1, wherein the sinkhole DNS server does not respond with a message that indicates a domain is not found.

4. The method of embodiment 1, wherein the sinkhole DNS server responds to the DNS query with a message that indicates the DNS query completed successfully (NOERR).

5. The method of embodiment 1, wherein the sinkhole DNS server responds to the DNS query with a message that indicates there is no answer to the DNS query (NOANS).

6. The method of embodiments 4 or 5, wherein following the response of the sinkhole DNS server, an alert is generated at the third party environment.

7. The method of any preceding embodiment wherein the method further comprises:

prior to forwarding the DNS query to a sinkhole DNS server if the DNS query comprises an unauthorised domain name, determining whether the DNS query comprises an address in a whitelist; and upon determining that the address is not in the whitelist; forwarding the DNS query to the sinkhole DNS server.

8. The method of any preceding embodiment wherein the method further comprises:

prior to forwarding the DNS query to a default DNS server of the third party cloud computing environment if the DNS query does not comprise an unauthorised domain name, determining whether the DNS query comprises an address in a whitelist; and upon determining that the address is in the whitelist; forwarding the DNS query to the default DNS server.

9. The method of embodiment 1, further comprising applying forwarding rules to the DNS query.

10. The method of embodiment 9, wherein the forwarding rules comprise:

determining whether the DNS query comprises an authorised external domain name; and forwarding the DNS query to the default DNS server of the third party cloud environment if the DNS query comprises an authorised external domain name.

11. The method of embodiment 10, wherein the default DNS server comprises a DNS server in a shared access area.

12. The method of embodiment 10, wherein the method further comprises determining that the DNS query comprises an authorised external domain name if the DNS query comprises an address in a whitelist.

13. The method of embodiment 9, wherein the forwarding rules comprise:
   determining whether the DNS query comprises a local address; and
   forwarding the DNS query to the native DNS server of the third party cloud environment if the DNS query comprises a local address.

14. The method of embodiment 13, wherein the default DNS server comprises a DNS server in an area local to the local address.

15. The method of embodiment 13, wherein the method further comprises determining the DNS query comprises a local address if the DNS query comprises an address in a whitelist.

16. The method of embodiment 9, wherein the forwarding rules comprise:
   determining whether the DNS query comprises a shared access area of the third party cloud computing environment; and
   forwarding the DNS query to the native DNS server of the third party cloud environment if the DNS query comprises a shared access area of the third party cloud computing environment.

17. The method of embodiment 16, wherein the default DNS server comprises a DNS server in the shared access area.

18. The method of embodiment 17, wherein the method further comprises determining the DNS query comprises a shared access area if the DNS query comprises an address in a whitelist.

19. The method of embodiment 9, wherein the forwarding rules comprise:
   determining whether the DNS query comprises an unauthorised domain name
   forwarding the DNS query to the sinkhole DNS server if the DNS query comprises an unauthorised domain name.

20. The method of embodiment 19, wherein the sinkhole DNS server comprises a sinkhole DNS server in the shared access area.

21. The method of embodiment 20, wherein the method further comprises determining the DNS query comprises a local address if the DNS query comprises an address in a whitelist.

22. The method of any one of embodiments 9 to 21, wherein the third party cloud computing environment comprises a plurality of user account areas accessible by respective users, wherein each user account comprises the forwarding rules.

23. The method of embodiment 22, wherein each user account area comprises a DNS server that can act as the default DNS server.

24. The method of embodiments 22 or 23, wherein the sinkhole DNS server is located in a shared access area of the third party cloud computing environment, wherein each user account area can access the shared access area.

25. The method of embodiment 24, the shared access area comprises a DNS server that can act as the default server.

26. The method of any preceding embodiment, wherein the third party cloud computing environment restricts or throttles DNS query traffic.

27. The method of any preceding embodiment, wherein the third party cloud computing environment restricts a burst size of DNS query traffic.

28. The method of any preceding embodiment, wherein the third party cloud computing environment generates an alert in response to a DNS exfiltration attempt.

29. The method of any preceding embodiment, wherein the third party cloud computing environment scans logs to identify a DNS exfiltration attempt.

30. The method of embodiment 29, wherein upon detection of a DNS Exfiltration attempt, the third party cloud computing environment isolates, snapshots, and terminates an instance that resulted in detection of the DNS Exfiltration attempt.

31. The method of any preceding embodiment wherein the default DNS server is configured to provide the DNS sinkhole server.

32. A cloud computing environment comprising processing circuitry which is configured to execute computer executable code, that when executed, performs the steps of any preceding embodiment.

33. One or more computing devices comprising computer executable code, that when executed by the one or more computing devices, performs the steps of any one of embodiments 1 to 31.

34. Computer program comprising computer executable code, that when executed on a computing device, performs all the steps of the preceding any one of embodiments 1 to 31.

The invention claimed is:

1. A method for resolving a DNS query received at a third party cloud computing environment, the method comprising:
   configuring the third party cloud computing environment for a first user of the third party cloud computing environment to have access to secure data in a second user's account area of the third party cloud computing environment;
   receiving the DNS query at the third party cloud computing environment from the first user;
   determining that the DNS query comprises an unauthorised domain name based on a first forwarding rule of a plurality of forwarding rules defined for the second user's account area;
   forwarding the DNS query to a sinkhole DNS server based on a second forwarding rule of the plurality of forwarding rules; and
   responding to the DNS query by transmitting a decoy message that falsely indicates the DNS query has been successfully resolved based on a third forwarding rule of the plurality of forwarding rules,
   wherein the second user's account area comprises a logically and functionally isolated processing segment of the third party cloud computing environment, and
   wherein the first user and the second user are different types of users.

2. The method of claim 1, wherein the sinkhole DNS server is implemented in the third party cloud computing environment.

3. The method of claim 1, wherein the method further comprises:
   determining that the DNS query is a DNS exfiltration attempt by at least scanning a data log of DNS queries maintained by the sinkhole DNS server.

4. The method of claim 3, wherein the method further comprises:
   generating an alert in response to the further determining.

5. The method of claim 1, wherein the sinkhole DNS server responds to the DNS query with a message that indicates the DNS query completed successfully.

6. The method of claim 1, wherein the sinkhole DNS server responds to the DNS query with a message that indicates there is no answer to the DNS query.

7. The method of claim 1, wherein the method further comprises:
  prior to forwarding the DNS query to the sinkhole DNS server, determining that the DNS query comprises an address that is not in a whitelist.

8. The method of claim 1, wherein the method further comprises:
  prior to forwarding the DNS query to the sinkhole DNS server, determining that the DNS query comprises a domain name that is present in a blacklist.

9. The method of claim 1, wherein the method further comprises:
  determining whether the DNS query comprises a local address.

10. The method of claim 1, wherein the method further comprises:
  determining whether the DNS query comprises a shared access area of the third party cloud computing environment.

11. The method of claim 1, wherein the method further comprises:
  restricting the burst size of DNS query traffic in response to the determining.

12. The method of claim 1, wherein the method further comprises:
  throttling DNS query traffic in response to the determining.

13. A system comprising:
  processing circuitry configured to execute computer executable code, that when executed, performs the following steps:
    configure a third party cloud computing environment for a first user of the third party cloud computing environment to have access to secure data in a second user's account area of the third party cloud computing environment;
    receive a DNS query, by one or more processor devices, at the cloud computing environment from the first user;
    determine that the DNS query comprises an unauthorised domain name based on a first forwarding rule of a plurality of forwarding rules defined for the second user's account area;
    forward the DNS query to a sinkhole DNS server based on a second forwarding rule of the plurality of forwarding rules; and
    respond to the DNS query by transmitting a decoy message that falsely indicates the DNS query has been successfully resolved based on a third forwarding rule of the plurality of forwarding rules,
    wherein the second user's account area comprises a logically and functionally isolated processing segment of the third party cloud computing environment, and
    wherein the first user and the second user are different types of users.

14. One or more computing devices comprising computer executable code, that when executed by one or more hardware processors of the one or more computing devices, performs the following steps:
  configure a third party cloud computing environment for a first user of the third party cloud computing environment to have access to secure data in a second user's account area of the third party cloud computing environment;
  receive a DNS query at the cloud computing environment from the first user;
  determine that the DNS query comprises an unauthorised domain name based on a first forwarding rule of a plurality of forwarding rules defined for the second user's account area;
  forward the DNS query to a sinkhole DNS server based on a second forwarding rule of the plurality of forwarding rules; and
  respond to the DNS query by transmitting a decoy message that falsely indicates the DNS query has been successfully resolved based on a third forwarding rule of the plurality of forwarding rules,
  wherein the second user's account area comprises a logically and functionally isolated processing segment of the third party cloud computing environment, and
  wherein the first user and the second user are different types of users.

15. A non-transitory computer readable storage medium comprising computer executable code, that when executed on a computing device, performs the following steps:
  configure a third party cloud computing environment for a first user of the third party cloud computing environment to have access to secure data in a second user's account area of the third party cloud computing environment;
  receive a DNS query, by one or more processor devices, at the cloud computing environment from the first user;
  determine that the DNS query comprises an unauthorised domain name based on a first forwarding rule of a plurality of forwarding rules defined for the second user's account area;
  forward the DNS query to a sinkhole DNS server based on a second forwarding rule of the plurality of forwarding rules; and
  respond to the DNS query by transmitting a decoy message that falsely indicates the DNS query has been successfully resolved based on a third forwarding rule of the plurality of forwarding rules,
  wherein the second user's account area comprises a logically and functionally isolated processing segment of the third party cloud computing environment, and
  wherein the first user and the second user are different types of users.

16. A method for resolving a DNS query received at a third party cloud computing environment, the method comprising:
  configuring the third party cloud computing environment for a first user of the third party cloud computing environment to have access to secure data in a second user's account area of the third party cloud computing environment;
  receiving the DNS query at the third party cloud computing environment from the first user;
  determining that the DNS query comprises an unauthorised domain name based on a first forwarding rule of a plurality of forwarding rules defined for the second user's account area;
  forwarding the DNS query to a sinkhole DNS server based on a second forwarding rule of the plurality of forwarding rules; and
  determining that the DNS query is a DNS exfiltration attempt by at least scanning a data log of DNS queries maintained by the sinkhole DNS server based on a third forwarding rule of the plurality of forwarding rules,
  wherein the second user's account area comprises a logically and functionally isolated processing segment of the third party cloud computing environment, and wherein the first user and the second user are different types of users.

17. The method of claim 16, wherein the sinkhole DNS server is implemented in the third party cloud computing environment.

18. The method of claim 16, wherein the method further comprises:
responding to the DNS query by transmitting a decoy message that falsely indicates the DNS query has been successfully resolved.

19. The method of claim 16, wherein the sinkhole DNS server responds to the DNS query with a message that indicates the DNS query completed successfully.

20. The method of claim 16, wherein the sinkhole DNS server responds to the DNS query with a message that indicates there is no answer to the DNS query.

* * * * *